United States Patent [19]

Kubo et al.

[11] Patent Number: 5,270,436
[45] Date of Patent: Dec. 14, 1993

[54] POLYESTER FOR ELECTROPHOTOGRAPHY

[75] Inventors: Shinji Kubo; Noriyuki Tajiri; Hitoshi Iwasaki; Masayuki Takyu, all of Toyohashi; Masahiro Itoh; Hirokazu Ito, both of Nagoya, all of Japan

[73] Assignee: Mitsubishi Rayon Company Ltd., Tokyo, Japan

[21] Appl. No.: 711,033

[22] Filed: Jun. 6, 1991

[30] Foreign Application Priority Data

Jun. 7, 1990 [JP] Japan .................... 2-147297

[51] Int. Cl.$^5$ .............................. C08G 63/00
[52] U.S. Cl. ............................ 128/176; 528/129; 528/148; 528/159; 528/160; 528/161; 528/173; 528/190; 528/192; 528/193; 528/194
[58] Field of Search ............ 430/109; 528/179, 129, 528/176, 148, 159, 160, 161, 173, 190, 192, 193, 194

[56] References Cited

U.S. PATENT DOCUMENTS 4,533,614  8/1985  Fukumoto et al. .............. 430/109

FOREIGN PATENT DOCUMENTS 0291059  11/1988  European Pat. Off.
0312691   4/1989  European Pat. Off.
0333498   9/1989  European Pat. Off.

*Primary Examiner*—John Kight, III
*Assistant Examiner*—Duc Troung
*Attorney, Agent, or Firm*—Oblon, Spivak, McClelland, Maier & Neustadt

[57] ABSTRACT

A polyester for electrophotography derived from
(a) at least one component selected from tri- or tetrabasic acid components and tri- or tetra-hydric alcohols;
(b) at least one component selected from dibasic carboxylic acids and lower alkyl esters thereof; and
(c) at least one component selected from aromatic diols and alicyclic diols wherein the proportion of x (mole %) of component (a) to the whole acid components and the proportion y (mole %) of component (c) to the whole acid components satisfies the following formulae (1) and (2):

$$y < (133m + 51.5n) \log x + (60m + 25.43n) \quad (1)$$

$$y > (253m + 170n) \log x - (176m + 162n) \quad (2)$$

wherein $0 < y < 100$, $0.5 < x < 50$, $0 \leq y \leq 100$, $0.5 \leq x \leq 50$, m is a proportion of the tetrabasic acid or alcohol in component (a) (mole %), n is a proportion of the tribasic acid or alcohol in component (a) (mole %), and $m + n = 1$. The polyester possesses a good resistance to off-setting and good grinding characteristics.

6 Claims, No Drawings

POLYESTER FOR ELECTROPHOTOGRAPHY

BACKGROUND OF THE INVENTION

1. Field of the Invention

The present invention relates to a polyester resin for a dry toner which is used for developing an electrostatic image in an electrophotographic process, an elctrostatically recording process, an electrostatically printing process or the like. More particularly, the invention relates to a polyester resin for a dry toner having a high resistance to off-setting and excellent grinding properties.

2. Description of the Related Art

In a method of obtaining a permanent real image from an electrostatic image, an electrostatic image formed on a photoconductive photosensitive material or an electrostatically recording material is developed with a toner, which has been charged by friction in advance, and then fixed.

The fixing is carried out either by directly fusing the toner image obtained by the development on a photoconductive photosensitive material or an electrostatically recording material, or by transferring the toner onto a paper or film, and then fusing it onto the transferred sheet. The fusion of the toner image is carried out by bringing it into contact with a solvent vapor, applying pressure, and heating. The heating is carried out by a non-contact heating method using an electric oven or a roll-bonding method using heated rolls; currently the latter is chiefly used because of the requirement for an accelerated fixing stage.

A one-component type toner or a two-component type toner is used in the dry developing process. The two-component toner is produced by initially melt-kneading a resin, a coloring agent, an electrostatic regulator and other required additives, to sufficiently disperse them, and then coarsely grinding and finely grinding the mixture to a predetermined particle size classification. The one component type is produced similarly but with the addition of a magnetic iron powder to the respective components of the two component type toner.

Because it is the main component in the toner formulation, the resin has a great influence over the major properties for the toner, and accordingly, the resin used for a toner must have a good dispersibility of the coloring agent in the melt kneading stage and good grindability in the grinding stage, during the toner production. Furthermore, a wide variety of properties such as a good fixing, good off-setting, good blocking, and good electric properties are required for the toner, when used.

As the resins used in the production of the toner, epoxy resins, polyester resins, polystyrene resins, methacrylic resins and the like are known. In the case of the combined process of crimping, heating, and fixing, a copolymer of styrene and a (meth)acrylate has been chiefly used, but due to its capability of being fixed at a lower temperature and the high resistance of the toner image, which has been fixed, to a plasticizer for the vinyl chloride resin, a polyester resin is now increasingly used.

Polyester resins are produced by a direct esterification of a divalent carboxylic acid or a lower ester thereof and a diol, or by the condensation reaction in the ester-exchange. In the polyesters for a toner, to impart an off-setting resistance in the fixing stage, it has been suggested that a tri- or poly-valent carboxylic acid or alcohol be copolymerized with the above-mentioned usual components, to provide a weakly cross-linked structure.

However, a toner which uses the conventional polyester resin obtained by the copolycondensation of a tri- or poly-valent carboxylic acid or alcohol has a disadvantage of a poor grinding efficiency during the toner production, and this disadvantage must be alleviated.

The inventors have investigated the causes of why a toner having an excellent resistance to off-setting can be achieved by a copolycondensation of the tri- or poly-functional monomer in the prior art, but the efficiency of grinding during the toner production is worsened and as a result, found that the grinding efficiency can be kept within a satisfactory range by selecting the proper ratio of a tri- or poly-valent acid or alcohol monomer to an aromatic diol or an alicyclic diol. That is, the following findings have been made. If the tri- or poly-functional monomer is used in a large amount, the molecular weight $M_w$ is lowered and although this leads to an increased grinding speed, a large amount of fine powder which cannot be used for toner is generated, and thus this leads to a poor yield and a lower productivity. Conversely, if the amount of the tri- or poly-functional monomer is small, although the molecular weight $M_w$ is increased, the grinding speed is markedly lowered, resulting in a lowering of the toner productivity.

SUMMARY OF THE INVENTION

Therefore, an object of the present invention is, to provide a polyester resin for a dry toner which possesses both a good resistance to off-setting and an excellent grinding property.

To solve the above-mentioned problem, the present invention provides a polyester for electrophotography derived from (a) at least one component selected from tri- or tetra-basic acid components and tri- or tetra-hydric alcohols;

(b) at least one component selected from dibasic carboxylic acids and lower alkyl esters thereof; and (c) at least one component selected from aromatic diols and alicyclic diols wherein the proportion x (mole %) of component (a) to the whole acid components and the proportion y (mole %) of component (c) to the whole acid components satisfy the following formulae (1) and (2):

$$y < (133m + 51.5n) \log x + (60m + 25.43n) \quad (1)$$

$$y > (253m + 170n) \log x - (176m + 162n) \quad (2)$$

wherein $0 < y < 100$, $0.5 < x < 50$, m is a proportion of the tetrabasic acid or alcohol in component (a) (mole n is a proportion of the tribasic acid or alcohol in component (a) (mole %), and $m + n = 1$.

DESCRIPTION OF THE PREFERRED EMBODIMENTS

Examples of tri- or tetra-valent acid components and alcohols (a) include trimellitic acid (1,2,4-benzene tricarboxylic acid), 1,2,4-cyclohexane tricarboxylic acid, 2,5,7-naphthalene tricarboxylic acid, 1,2,4-butane tricarboxylic acid, 1,2,5-hexane tricarboxylic acid, pyromellitic acid (1,2,4,5-benzene tetracarboxylic acid), 1,2,7,8-octane tetracarboxylic acid and anhydrides and alkyl esters thereof; and 1,2,4-butane triol, 1,2,5-pentane triol, glycerol, 2-methylpropane triol, 2-methyl-1,2,4-butane triol, trimethylol ethane, trimethylol propane, 1,3,5-trihydroxymethyl benzene, and pentaerythritol. These acid components and alcohols may be used alone or as a mixture thereof.

Examples of the dibasic acids and lower alkyl esters thereof which are used herein include terephthalic acid, isophthalic acid, sebacic acid, isodecyl succinic acid, maleic acid, fumaric acid, and monomethyl-, monoethyl-, dimethyl-, and diethyl-esters thereof, with terephthalic acid, isophthalic acid and dimethyl esters thereof being particularly preferable in terms of a resistance to blocking and in cost. These dibasic acids and the lower alkyl esters greatly influence the fixing property and the resistance to blocking of the toner. Specifically, depending upon the condensation degree, when an aromatic acid such as terephthalic acid or isophthalic acid is used in a large amount, the resistance to blocking is enhanced, but the fixing property is lowered. Conversely, if sebacic acid, isodecyl succinic acid, maleic acid, fumaric acid or the like is used in a large amount, the fixing property is enhanced, but the resistance to blocking is lowered. Consequently, in addition to the composition and proportions of other monomers and the condensation degree, these dibasic carboxylic acids are selected appropriately, and are used alone or in combination.

Concrete examples of aromatic diols and the alicyclic diols used herein include polyoxyethylene-(2.0)-2,2-bis-(4-hydroxyphenyl)propane, polyoxypropylene-(2.0)-polyoxyethylene-(2.0)-2,2-bis(4-hydroxyphenyl)propane, polyoxypropylene-(6)-2,2-bis(4-hydroxyphenyl)propane, polyoxypropylene-(2.0)-2,2-bis(4-hydroxyphenyl)propane, polyoxypropylene-(2.2)-2,2-bis(4-hydroxyphenyl)propane, polyoxypropylene-(2.3)-2,2-bis(4-hydroxyphenyl)propane, polyoxypropylene-(2.4)-2,2-bis(4-hydroxyphenyl)propane, polyoxypropylene-(3.3)-2,2-bis(4-hydroxyphenyl)propane, cyclohexane dimethanol, hydrogenated bisphenol A, and the like, and are used alone or as a mixture thereof.

Aside from the above-mentioned component (a) and component (c), other alcoholic components, i.e. diols other than the aromatic and alicyclic diols, also may be used as occasion demands. Concrete examples of such diols include ethylene glycol, neopentyl glycol, butane diol, polyethylene glycol and the like, and among them, ethylene glycol, neopentyl glycol, and butane diol, are preferred in terms of the fixing property.

In the present invention, the most important point is that the ratio of the tri- or tetra-valent acid component or alcohol [component (a)] to the aromatic or alicyclic diol [component (c)] fulfills the above-mentioned formulae (1) and (2). Namely, when the tetrabasic acid component and/or the tetrahydric alcohol is used as component (a) [i.e. m=1, and n=0 in the above-mentioned formulae (1) and (2)], the following formulae (3) and (4):

$$y < 133 \log x + 60 \tag{3}$$

$$y > 253 \log x - 176 \tag{4}$$

should be satisfied. When the tribasic acid component and/or the trihydric alcohol is used as component (a) [i.e. m=0, n=1 in the above-mentioned formulae (1) and (2)], the following formulae (5) and (6):

$$y < 51.5 \log x + 25.4 \tag{5}$$

$$y > 170 \log x - 162 \tag{6}$$

should be satisfied. (In any formula, $0 < y < 100$, $0.5 \leq x \leq 50$.)

The aromatic diol and the alicyclic diol [component (c)] from a very rigid polymer, and where the proportion of the tri- or tetra-valent monomer [component (a)] is small, if the aromatic diol or the alicyclic diol is used in a high proportion, the molecular weight $M_w$, becomes too high, and thus becomes too rigid when the viscosity is adjusted to be suitable for use in the binder for toner. Accordingly, the grinding speed is lowered and the productivity is also lowered. Where the proportion of the tri- or tetra-valent acid component or alcohol [component (a)] is large, if the amount of this diol to be used is small, the $M_w$ becomes low, and thus the toner possesses a good fixing property and the grinding speed becomes fast, but a large amount of fine powder possessing a particle size of not more than 5 microns, which cannot be used for the binder for toner, is generated to thereby lower the yield when the viscosity is adjusted to be suitable for use in the binder for toner (in general, when the softening temperature of the resin is within the range of 100°-160° C.).

Specifically, if the relationship between the proportion of the aromatic diol and the alicyclic diol [components (c)] to the whole acid components expressed as y (mole %) ($0 < y < 100$) and the proportion of the tri- or tetra-valent acid component or alcohol [component (a)] to the whole acid components expressed as x (mole) ($0.5 < x < 50$) is $$y \geq (133m + 51.5n) \log x + (60m + 25.4n),$$

the grinding speed is slow, and thus the productivity is worsened. Conversely, if the relationship is $$y \leq (253m + 170n) \log x - (176m + 162n),$$

fine powders having a particle size of not more than 5 microns are generated in a large amount, thereby lowering the yield.

Namely in the polyester of the present invention, which is used as a binder for dry toner, the ratio of the tri- or tetra-valent acid component or alcohol to the aromatic diol or alicyclic diol must fulfill the above-mentioned formulae (1) and (2).

The polyester resin of the present invention can be used as the resin for dry toner as is, or as a blend with other resins, for a toner. Furthermore, a dry toner can be prepared in a similar manner to those toners which are used in many other routine resin binders. Further, additive components usually used in the toner also may be added.

Examples of the present invention will now be explained, but the aspects of the present invention are not be limited thereto.

In the examples, each of the characteristic values was evaluated as follows:

The "softening temperature" refers to the temperature at which half of 1 g of a given sample flows out when measured with a nozzle of 1 mm × 10 mm at a load of 30 kgf under a constant temperature increase of 3° C./min, using a CFT-500 flow tester available from Shimazu Corporation.

The grinding was evaluated by using an LABOJET (Model LJ) supersonic jet grinder available from Nippon Pneumatic Kogyo Co., Ltd., wherein by setting the classification point at 25 microns and varying the amounts incorporated, the volume average particle size was controlled to 11 microns, and the degree of grindability was evaluated based upon the yield after 30 minutes. In this case, the initial particle size of the resin to be incorporated in the LABOJET was adjusted to not more than 3 mm, by using a chopper mill. Specifically, with respect to the grinding speed, it can be evaluated that the grindability of the resin having a yield after 30 minutes of not less than 50 g is good. On the other hand, for the formation of fine powder, it can be evaluated as good when the ground product obtained is classified at a classification point of 5 microns with an air classification machine, and each of the yields is calculated in percentage by weight, and the resin at a classification point of not more than 5 microns is not more than 10% by weight.

EXAMPLE 1

According to the composition listed in Table 1, terephthalic acid, isophthalic acid, pyromellitic acid, ethylene glycol, a bisphenol derivative and pentaerythritol were incorporated in a reaction vessel having a distillation column.

Further, 0.03% by weight of dibutyl tin oxide was added to the reaction vessel based on the total acidic components. While maintaining the inner temperature at 220° C. and the stirring revolutions at 200 rpm, the esterification reaction was brought about at normal pressure, during which the reaction system became clear after 4.5 hours. Subsequently, while maintaining the inner temperature at 235° C. and the stirring revolutions at 200 rpm, and reducing the inner pressure of the reaction system, the polycondensation reaction was terminated when the stirring torque reached 3.0 kg-cm.

Resins $R_1$ to $R_5$ were obtained, and the particle sizes thereof were adjusted to not less than 3 mm, and by applying a jet mill with the classification point set at 25 microns thereto, the grindabilities thereof were evaluated. The results of the grindability evaluations are shown in Table 1. From Table 1, which shows not less than 100 g of the yields of resins $R_1$ to $R_5$ and little formation of fine powder having a particle size of not more than 5 microns, resins $R_1$ to $R_5$ were found to have a satisfactory grindability.

TABLE 1

|  | R1 | R2 | R3 | R4 | R5 |
| --- | --- | --- | --- | --- | --- |
| Acid components (mole %) | | | | | |
| Terephthalic Acid | 60 | 60 | 58 | 55 | 58 |

TABLE 1-continued

|  | R1 | R2 | R3 | R4 | R5 |
| --- | --- | --- | --- | --- | --- |
| Isophthalic Acid | 40 | 40 | 40 | 40 | 40 |
| Trimellitic Acid | — | — | 2 | 5 | 2 |
| Alcoholic components (mole %) | | | | | |
| Ethylene Glycol | 47 | 13 | 70 | 50 | 30 |
| Diol A*1 | 50 | 80 | 30 | — | 70 |
| Pentaerythritol | 3 | 7 | — | — | — |
| Hydrogenated Bisphenol A | — | — | — | 50 | — |
| Softening Temperature T (°C.) | 155 | 134 | 161 | 142 | 161 |
| Grinding Properties | | | | | |
| Yield*2 (g) | 56 | 160 | 55 | 151 | 51 |
| Not more 5 μm*3 (% by weight) | 1 | 7 | 1 | 3 | 1 |

*1Diol A: Polyoxypropylene-(2.3)-2,2-bis(4-hydroxyphenyl)-propane
*2Yield: Yield obtained after 30 minutes when the volume average particle size was set at 11 μm.
*3Not more than 5 μm: The rate of powders having a particle size of not more than 5 μm contained in the resulting ground resin product

EXAMPLE 2

The same operation as in Example 1 was carried out except that the compositions to be incorporated were changed as shown in Table 2 to obtain Resins $R_6$ to $R_{10}$. The results of the evaluations of their characteristics are shown in Table 2.

TABLE 2

|  | R6 | R7 | R8 | R9 | R10 |
| --- | --- | --- | --- | --- | --- |
| Acid components (mole %) | | | | | |
| Terephthalic Acid | 50 | 40 | 40 | 40 | 60 |
| Isophthalic Acid | 40 | 40 | 30 | 40 | 37 |
| Pyromellitic Acid | 10 | 20 | 30 | 20 | 3 |
| Alcoholic components (mole %) | | | | | |
| Ethylene Glycol | 50 | 30 | 5 | 30 | 60 |
| Diol A*1 | 50 | 70 | 95 | — | 40 |
| Hydrogenated Bisphenol A | — | — | — | 70 | — |
| Softening Temperature T (°C.) | 149 | 141 | 135 | 151 | 162 |
| Grinding Properties | | | | | |
| Yield*2 (g) | 75 | 161 | 158 | 80 | 51 |
| Not more 5 μm*3 (% by weight) | 1 | 8 | 3 | 2 | 1 |

*1Diol A: Polyoxypropylene-(2.3)-2,2-bis(4-hydroxyphenyl)-propane
*2Yield: Yield obtained after 30 minutes when the volume average particle size was set at 11 μm.
*3Not more than 5 μm: The rate of powders having a particle size of not more than 5 μm contained in the resulting ground resin product As shown in Table 2, the yields were not less than 50 g, and only a little fine powder was formed, indicating that the grindability of resins $R_6$ to $R_{10}$ was good.

COMPARATIVE EXAMPLE

The same operation as in Example 1 was carried out except that the compositions to be incorporated were changed as shown in Table 3 to obtain Resins $R_{11}$ to $R_{18}$. The results of the evaluations of their characteristics are shown in Table 3.

TABLE 3

|  | R11 | R12 | R13 | R14 | R15 | R16 | R17 | R18 |
| --- | --- | --- | --- | --- | --- | --- | --- | --- |
| Acid components (mole %) | | | | | | | | |
| Terephthalic Acid | 50 | 55 | 58 | 60 | 60 | 60 | 60 | 60 |
| Isophthalic Acid | 20 | 25 | 40 | 40 | 40 | 25 | 40 | 40 |
| Trimellitic Acid | 30 | 20 | 2 | — | — | 15 | — | — |
| Alcoholic components (mole %) | | | | | | | | |
| Ethylene Glycol | 70 | 90 | 50 | 19 | 65 | 10 | 49.3 | 84 |
| Diol A*1 | 30 | 10 | — | 80 | 20 | 90 | — | — |
| Hydrogenated Bisphenol A | — | — | 50 | — | — | — | 50 | 1 |
| Pentaerythritol | — | — | — | 1 | 15 | — | 0.7 | 15 |
| Softening Temperature T (°C.) | 125 | 131 | 163 | 168 | 128 | 161 | 170 | 118 |
| Grinding Properties | | | | | | | | |
| Yield*2 (g) | 172 | 161 | 48 | 41 | 168 | 49 | 40 | 177 |

TABLE 3-continued

|  | R11 | R12 | R13 | R14 | R15 | R16 | R17 | R18 |
|---|---|---|---|---|---|---|---|---|
| Not more 5 μm*3 (% by weight) | 21 | 19 | 1 | 1 | 14 | 1 | 1 | 36 |

*1Diol A: Polyoxypropylene-(2.3)-2,2-bis(4-hydroxyphenyl)-propane
*2Yield: Yield obtained after 30 minutes when the volume average particle size was set at 11 μm.
*3Not less than 5 μm: The rate of powders having a particle size of not more than 5 μm contained in the resulting ground resin product It was found from the results of Table 3 that resins $R_{11}$, $R_{12}$, $R_{15}$, and $R_{18}$ have a very good grindability, but large amounts of fine powders having a particle size of not more than 5 microns, which cannot be used in toner, were generated. In resins $R_{13}$, $R_{14}$, $R_{16}$, and $R_{17}$, it was found that, in spite of a less generation of fine powder, the grinding speeds were lowered.

The polyester for dry toner of the present invention possesses both a good resistance to off-setting and good grinding characteristics (high grinding speed and lower fine powder content).

We claim:

1. A polyester for electrophotography derived from
   (a) at least one component selected from tri- or tetra-basic acid components and tri- or tetra-hydric alcohols;
   (b) at least one component selected from dibasic carboxylic acids and lower alkyl esters thereof; and
   (c) at least one component selected from aromatic diols and alicyclic diols
   wherein the proportion x (mole %) of component (a) to the whole acid components and the proportion y (mole %) of component (c) to the whole acid components satisfies the following formulae (1) and (2):

$$y < (133m + 51.5n) \log x + (60m + 25.43n) \quad (1)$$

$$y > (253m + 170n) \log x - (176m + 162n) \quad (2)$$

wherein $0 < y < 100$, $0.5 < x \leq 50$, m is a proportion of the tetrabasic acid or alcohol in component (a) (mole n is a proportion of the tribasic acid or alcohol in component (a) (mole %), and $m + n = 1$.

2. A polyester as set forth in claim 1, wherein the component (a) is selected from trimellitic acid (1,2,4-benzene tricarboxylic acid), 1,2,4-cyclohexane tricarboxylic acid, 2,5,7-naphthalene tricarboxylic acid, 1,2,4-butane tricarboxylic acid, 1,2,5-hexane tricarboxylic acid, pyromellitic acid (1,2,4,5-benzene tetracarboxylic acid), 1,2,7,8-octane tetracarboxylic acid and anhydrides and alkyl esters thereof; and 1,2,4-butane triol, 1,2,5-pentane triol, glycerol, 2-methylpropane triol, 2-methyl-1,2,4-butane triol, trimethylol ethane, trimethylol propane, 1,3,5-trihydroxymethyl benzene, and pentaerythritol.

3. A polyester as set forth in claim 1, wherein the component (b) is selected from terephthalic acid, isophthalic acid, sebacic acid, isodecyl succinic acid, maleic acid, fumaric acid, and monomethyl-, monoethyl-, dimethyl-, and diethyl-esters thereof.

4. A polyester as set forth in claim 1, wherein the component (c) is selected from polyoxyethylene-(2.0)-2,2-bis-(4-hydroxyphenyl)propane, polyoxypropylene-(2.0)-polyoxyethylene -(2.0)-2,2-bis(4-hydroxyphenyl)-propane, polyoxypropylene-(6)-2,2-bis(4-hydroxyphenyl)propane, polyoxypropylene-(2.0)-2,2-bis(4-hydroxyphenyl)propane, polyoxypropylene-(2.2)-2,2-bis(4-hydroxyphenyl)propane, polyoxypropylene-(2.3)-2,2-bis(4-hydroxyphenyl)propane, polyoxypropylene-(2.4)-2,2-bis(4-hydroxyphenyl)propane, polyoxypropylene-(3.3)-2,2-bis(4-hydroxyphenyl)propane, cyclohexane dimethanol, and hydrogenated bisphenol A.

5. A polyester as set forth in claim 1, further comprising units derived from a diol other than the aromatic and alycyclic diols.

6. A polyester as set forth in claim 5, wherein the diol other than the aromatic and alycyclic diols is selected from ethylene glycol, neopentyl glycol, butane diol, and polyethylene glycol.

* * * * *